United States Patent [19]
Engeler et al.

[11] 3,781,827
[45] Dec. 25, 1973

[54] DEVICE FOR STORING INFORMATION AND PROVIDING AN ELECTRIC READOUT

[75] Inventors: William E. Engeler, Scotia; Marvin Garfinkel, Schenectady, both of N.Y.

[73] Assignee: General Electric Company, Schenectady, N.Y.

[22] Filed: Nov. 24, 1971

[21] Appl. No.: 201,855

Related U.S. Application Data
[62] Division of Ser. No. 792,569, Jan. 21, 1969.

[52] U.S. Cl. ....... 340/173 CA, 307/238, 317/235 R
[51] Int. Cl. ............................................. G11c 11/40
[58] Field of Search ............... 340/173 CA, 173 LS, 340/173 R; 317/235 B, 235 D, 235 E, 235 G, 236 N, 235 UA; 307/238, 279, 304, 308, 311, 319; 250/211, 212

[56] References Cited
UNITED STATES PATENTS

| | | | |
|---|---|---|---|
| 3,562,425 | 2/1971 | Poirier | 178/7.2 |
| 3,497,698 | 2/1970 | Phelan, Jr. et al. | 250/212 |
| 3,591,836 | 7/1971 | Booher | 317/231 |
| 3,387,286 | 6/1968 | Dennard | 340/173 CA |

Primary Examiner—James W. Moffitt
Attorney—Frank L. Neuhauser et al.

[57] ABSTRACT

An information storing method and a storing device using a conductor-insulator-semiconductor (CIS) structure as the storage element is disclosed within. The CIS structure is initially charged to a predetermined voltage, forming a depletion region within the semiconductor beneath the conductor. Minority carriers are controllably generated within the semiconductor in proportional response to an information-bearing signal such as a specific amount of electromagnetic radiation flux. The generated minority carriers move to and are stored at the surface of the semiconductor beneath the conductor due to the electric field existing in the depletion region, thus changing the predetermined voltage. The change in voltage which may be determined in a measure of the number of generated minority carriers and, therefore, is a measure of the integrated electromagnetic radiation flux and constitutes the stored information.

8 Claims, 11 Drawing Figures

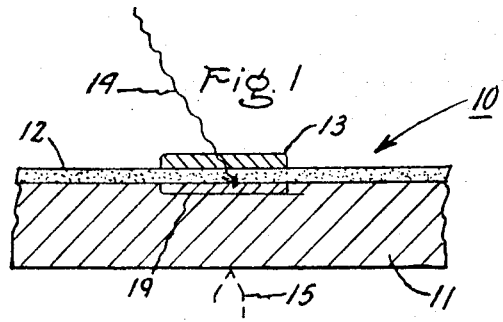
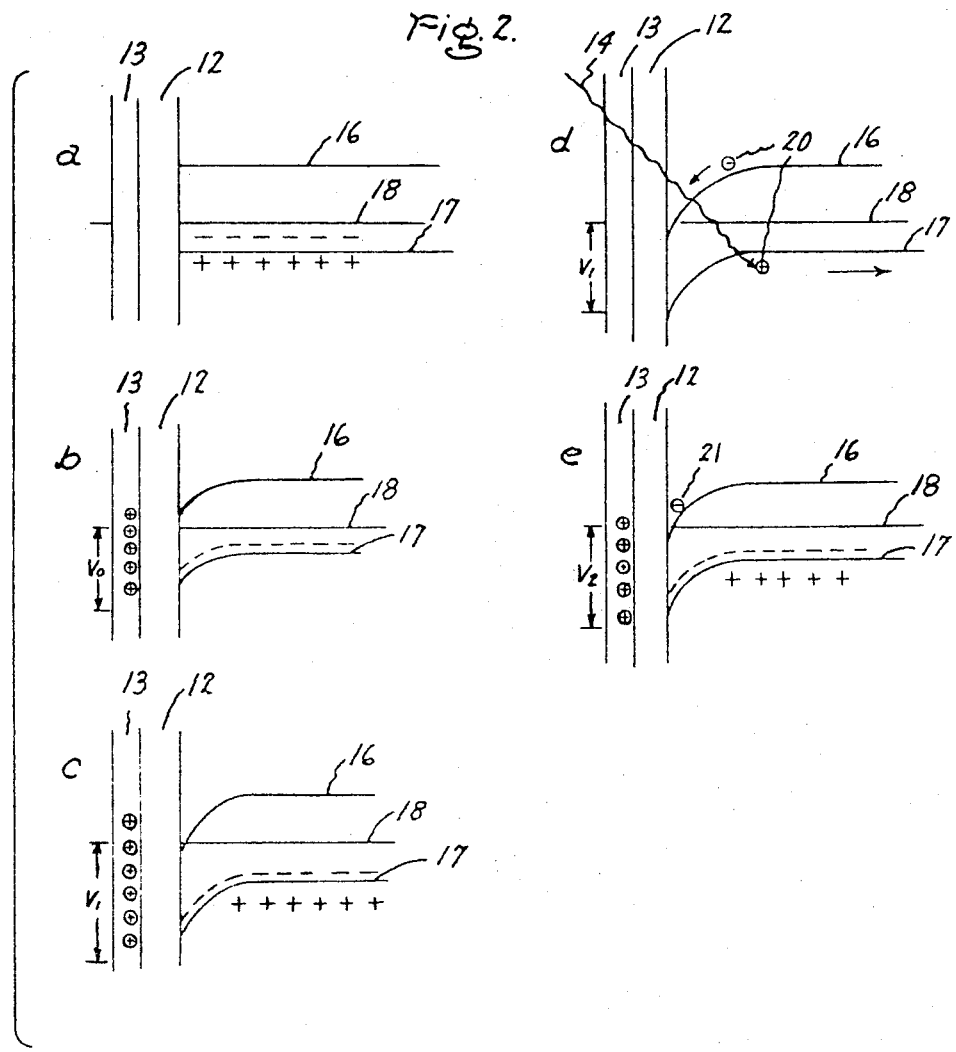

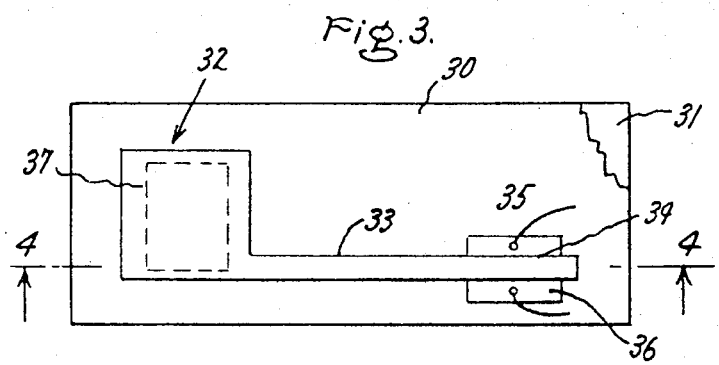
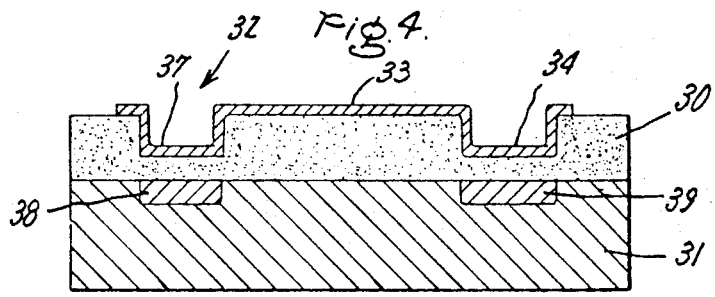
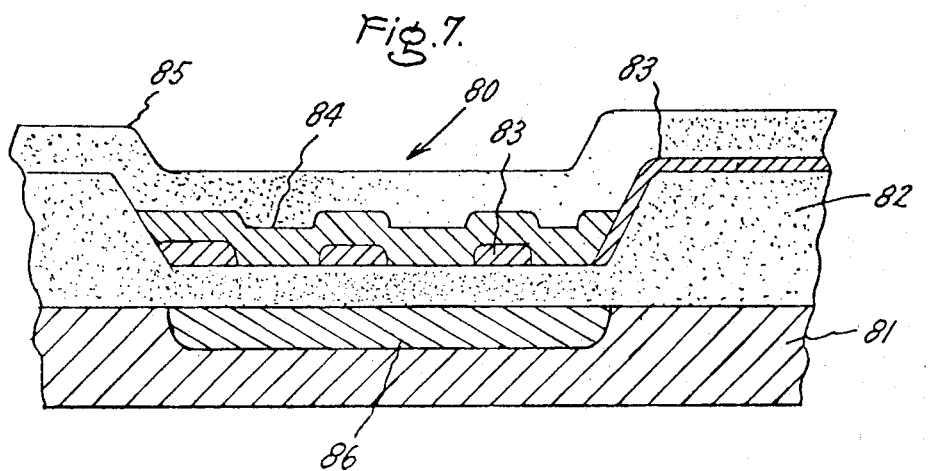

DEVICE FOR STORING INFORMATION AND PROVIDING AN ELECTRIC READOUT

This application is a divisional application of Ser. No. 792,569 filed Jan. 21, 1969.

The present invention relates to methods and devices which store information for later electrical readout. More particularly, the invention relates to methods and devices which sense and integrate electromagnetic radiation flux, store the integrated value, and are capable of electrical readout. This application is related to our copending application Ser. No. 792,488 filed Jan. 21, 1969 and now U.S. Pat. No. 3,623,026 RDCD-1101.

The importance of information storing devices, both long term and transitory, is well known to those versed in communication and related arts. Particular attention is being directed to the image sensing and storing devices which are widely employed, for example, in video communication systems and in infrared and x-ray systems. Devices employed in systems such as the above store the image momentarily and then, after a selected time interval, convert the image to an electric signal.

Continued requirements for smaller, highly reliable sensing and storage devices have motivated research to develop solid state imaging devices. As a result, in the steady growth of the semiconductor field, numerous variations in solid state imaging devices have been developed.

Many of the devices, however, are limited to single spot imaging applications due to multiple photoconductive cross-talk paths between the various elements comprising the device. A further limitation is the inability of many imaging devices to operate in a "light integration" mode. That is, the device functions to provide an electric signal only of what it "sees" at the instant the device is interrogated, thus precluding the device from acting even as a transistory storage device. The devices using p-n photodiodes ordinarily require electron-bean scanning for "readout" (release) of the stored image. Attempts which have been made to overcome the above limitations have resulted in complex devices in opposition to the need for simple, reliable image sensing and storing devices.

It is one object of the present invention to provide for a method of integrating and storing information in a solid state device.

Another important object is to provide for a simple and flexible image sensing and storing device operable in a light integration mode and capable of electrical readout.

Briefly, and in accordance with one embodiment of our present invention, a conductor-insulator-semiconductor structure is utilized as a capacitor to store information. The semiconductor material is selected, doped, and utilized in such a manner that the time constants involved in the generation of minority carriers by the material are large compared to the information storage interval. Thus, when the CIS structure is charged to a predetermined voltage which influences the band structure of the semiconductor at its surface, a depletion region forms in the semiconductor below the conductor. Minority carriers are generated within the semiconductor in controlled response to incoming information which may be in the form of electromagnetic radiation commensurate with the band gap energies of the semiconductor material. Minority carriers comprising the stored information are swept to and stored at the surface of the semiconductor material beneath the conductor by the electromagnetic field. The predetermined voltage is changed to a new value by the presence of the minority carriers at the insulator-semiconductor interface. The change in voltage is a measure of integrated electromagnetic radiation flux incident upon the semiconductor material subsequent to the time of charging.

The novel features believed characteristic of the present invention are set forth in the appended claims. The invention itself, together with further objects and advantages thereof, may best be understood by reference to the following detailed description taken in connection with the appended drawings, in which:

FIG. 1 illustrates in vertical cross section a conductor-insulator-semiconductor device in accord with one embodiment of our present invention.

FIG. 2a–2e illustrate schematically the band structure of conductor-insulator-semiconductor device sequentially operated in accord with our present invention.

FIG. 3 illustrates in plan view another embodiment of our present invention.

FIG. 4 illustrates the embodiment of FIG. 3 in cross section taken along lines 4—4.

FIG. 7 illustrates in vertical cross section another embodiment of our present invention.

Figure 5:
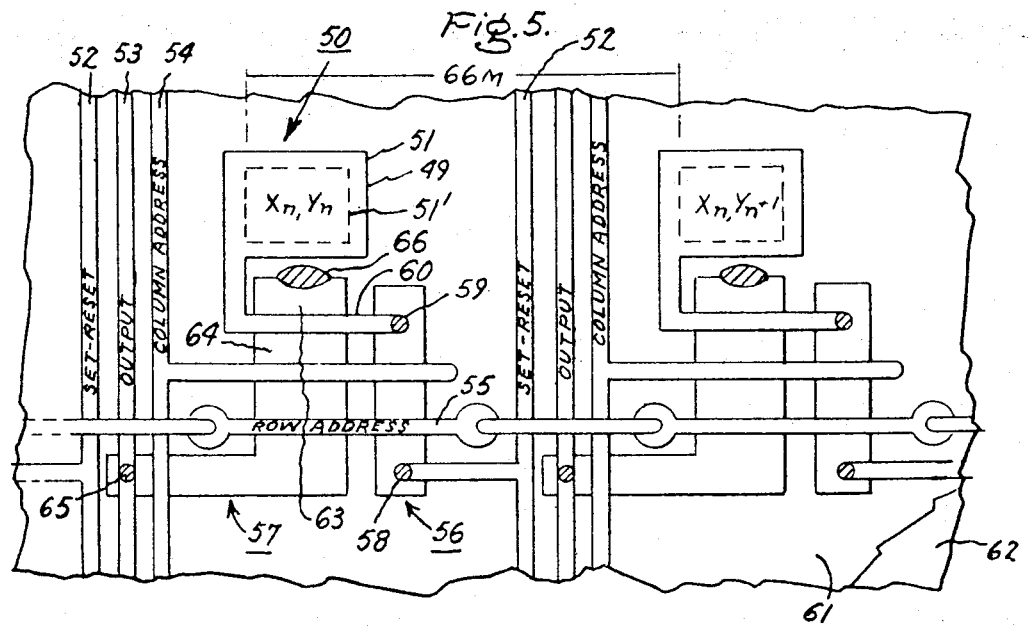
FIG. 5 illustrates a plan view of another embodiment of our present invention.

It has recently been found that conductor-insulator-semiconductor (CIS) devices may be utilized as capacitors to inject minority carriers into the bulk of the semiconductor, thereby eliminating the need for a p-n junction or an injecting contact. For example, when the semiconductor medium is of p-type and the metal or conductor plate is biased strongly positive with respect to the semiconductor, the band structure of the semiconductor is influenced, forming a depletion region. Minority carriers begin to accumulate at the insulator-semiconductor interface due to thermal generation after a period of time or, more quickly, due to quantum mechanical tunnelling, should the doping concentration of ionized impurity centers be sufficiently large.

We have discovered that through the proper selection of semiconductor material employed in a CIS capacitor (and subsequent operation thereof) that we are able to generate controllably minority carriers within the semiconductor material and, therefore, utilize the CIS capacitor as a mechanism for storing information and electrically reading out the stored information.

FIG. 1 illustrates the construction of an example CIS device 10 which may be utilized as above. In FIG. 1, a substrate 11 of p-type semiconductor material has an insulator layer 12 formed thereon. A conductor plate 13 is deposited on the insulator layer 12. An electromagnetic radiation ray 14 is shown penetrating conductor plate 13 and insulating layer 12. As illustrated by the broken lines, contact 15 is shown contacting substrate 11. Both radiation ray 14 and injecting contact 15 illustrate different techniques by which minority carriers may be provided. Though injecting contact 15 is disclosed as a point contact, a p-n junction contact may be employed when desired.

FIG. 2a represents the band structure of a CIS device before the conductor is biased. Lines 16 and 17 indicate, respectively, the band edges of the conduction and valence bands. Line 18 indicates the semiconductor Fermi level which is nearer the valence band because the semiconductor material employed herein for descriptive purposes is p-type. As is evident, the resultant electric field near the semiconductor-insulator interface is zero.

When a voltage $V_o$ is supplied, giving conductor plate 13 a positive bias, as shown in FIG. 2b, a depletion region 19 forms in substrate 11 beneath conductor plate 13. Initially, all the charge required by the external charging voltage is supplied by ionized impurity centers in a region (depletion region 19) near the surface which has been depleted of majority carriers (electropositive holes).

When there are no minority carriers present, depletion region 19 continues to extend into the bulk of the semiconductor as the biasing voltage is increased even after the bandedge 16 moves below the Fermi level 18. This is illustrated by FIG. 2c where the biasing voltage is $V_1$.

The surface of the semiconductor beneath conduction plate 13 is now in a non-equilibrium state. The width of depletion region 19 varies approximately inversely as the one-half power of the impurity concentration. The minority carriers which may be generated within or near the depletion region are swept to the semiconductor surface by the electromagnetic field within the depletion region. Generally, the source of minority carriers is the equilibrium number which exists in the semiconductor due to normal thermal generation-recombination processes. For example, the generation of minority carriers at room temperature in cadmium sulfide is of the order of $10^6$ carriers/cm$^3$-sec. We have found that by making depletion region 19 sufficiently short, the rate of minority carrier arrival at the surface of semiconductor substrate 11 is reduced to a nominal rate. Again using CdS as an example and noting that approximately $10^{12}$ charges/cm$^2$ are needed to invert the semiconductor, we have found that an interval of time on the order of $10^{10}$ seconds is required before equilibrium through bulk thermal generation may be reached when the depletion region depth is approximately $10^{-4}$ cm. By choosing the proper concentration of impurity centers, an effective depletion depth may be obtained which precludes a significant rate of arrival of thermally generated minority carriers at the surface of semiconductor substrate 11. When employing a semiconductor such as InSb having a narrow band gap, thermal generation of carriers at room temperature is excessive even for the smallest depletion depths. Devices fabricated utilizing such semiconductor materials must be cooled below room temperature for proper operation.

With sufficiently high concentration of impurity centers, very narrow depletion lengths are obtained. In this case, the electric fields within the depletion region are sufficiently high so that minority carriers may reach the surface of semiconductor 11 beneath conductor plate 13 by quantum mechanical tunnelling. For example, in FIG. 2c, electrons may tunnel from valence band 17 through the forbidden energy gap in the narrow depleted region to conduction band 16 in the inverted surface regions. By choosing a concentration below a level which varies for different semiconductor materials, the effect of tunnelling may be rendered small. This level of concentration varies with the type of semiconductor material chosen. Using CdS, for example, we have found that an impurity center concentration of $10^{17}$/cm$^3$ is sufficiently small to limit such tunnelling.

In general, the necessary impurity concentration varies with the type of semiconductor which is selected. Depletion depths which are smaller than several hundred Angstrom units are ordinarily avoided, thereby setting an approximately lower limit on depletion depths.

It is also important that no other source of minority carriers by present. The semiconductor region beneath conduction plate 13 must not be in electrical contact with a region of opposite conductivity type such as a diffused n-type region when the semiconductor is a p-type. Furthermore, it is important that the surface portions of the semiconductor extending laterally from the capacitor device (as seen in FIG. 1) be not inverted. Generally, this is accomplished by preventing the incorporation of any net charge within the insulator layer. Surface thermal generation of minority carriers is also reduced by maintaining the surface potential well below the inverted potential.

Because, as shown above, the ability of the semiconductor substrate 11 to produce minority carriers is substantially reduced or restricted, a means has now been provided by which information may be stored. More explicitly in reference to FIG. 2d, after removing or isolating the exterior charging source from the CIS structure, minority carriers may be controllably generated or introduced externally as by electromagnetic radiation as shown by electromagnetic radiation ray 14. Electromagnetic radiation having wavelengths shorter than that corresponding in energy to the width of the semiconductor band gap will be absorbed by the semiconductor. Electron hole pairs such as pair 20 are then generated. When the minority carrier is formed in or near the depletion region, it is swept to the surface of substrate 11 and stored there. Thus, the number of minority carriers which reach the surface is proportional to the integrated electromagnetic flux incident upon substrate 11 after conductor plate 13 was charged.

As is illustrated in FIG. 2e, the voltage appearing across the CIS structure is changed to a new value $V_2$ by the presence of the minority carriers at the surface of the semiconductor 11 beneath conductor plate 13. Thus, the difference in voltage $V_1-V_2$ is a measure of the amount of light flux which has been absorbed by semiconductor 11 since the CIS capacitor was originally charged to the predetermined voltage.

FIGS. 2a–2e, particularly FIG. 2d, illustrate but one technique by which minority carries may be provided. FIG. 1, as stated previously, also illustrates the use of an injecting contact 15 which may either be a point or p-n junction contact to provide carriers. The contact may be utilized to inject a desired number of minority carriers for storage purposes. The change in voltage due to the presence of carriers at the surface of semiconductor 11 beneath conductor plate 13 is a measure of the number of minority carriers injected into the semiconductor and stored at the surface beneath the conductor and, therefore, constitutes an electrical readout of stored information.

FIGS. 1 and 2d also illustrate that the incident electromagnetic radiation passes through conductor plate 13 and insulating layer 12. Such a mode of penetration allows substrate 11 to be fabricated with any desired thickness, thus rendering the manufacture of CIS structures more convenient. Conductor plate 13 may be a deposited metal plate substantially transparent to visible and longer wavelength radiation. The choice of material, however, depends primarily upon the wavelength of the selected incident light and the sensitivity of the semiconductor. It also should be understood that conducting media other than metal layers may be utilized such as a layer of tin oxide, for example, or doped semiconducting layers such as silicon.

The insulating layer 12 is chosen for reasons substantially set forth as above but may conveniently be $SiO_2$.

Under other circumstances it may be desirable to have the incident electromagnetic radiation penetrate into the semiconductor substrate through the major surface located on the side opposite the CIS structure. The substrate is then necessarily limited in thickness because the electron hole pairs must be formed sufficiently close to the depletion region so as to allow the minority carriers to reach the surface above the depletion region. It follows that when this is done, it is not necessary to have transparent conductors and insulators.

FIGS. 2a-2e show semiconductor substrate 11 as a p-type semiconductor. Alternatively, it may be preferable to employ an n-type semiconductor. Conductor plate 13 is then biased negatively and the minority carriers supplied to the semiconductor are electropositive holes which are swept to the semiconductor surface and stored.

FIG. 3 illustrates schematically in plan view a CIS capacitor with a device for electrical readout of th stored information. As shown in the embodiment of FIG. 3, an insulating layer 30 covers one surface of a semiconductor substrate 31. A conductor plate 32 is deposited on insulating layer 30 and has a narrow extension 33. Extension 33 at one end thereof remote from the main portion thereof is in registry with a pair of surface adjacent, conductivity-modified regions 35 and 36. This, in effect, forms a field effect transistor which may function to provide a current read-out in response to the stored minority carriers.

The dotted line in FIG. 3 illustrates the portion of conductor plate 32 which functions as the field plate 37 of the CIS capacitor. As is best seen in FIG. 4 which is a cross-sectional view of FIG. 3 along line 4—4, field plate 37 portion of conductor plate 32 is separated from semiconductor substrate 31 by a narrow thickness of insulating layer 30. Extension 33 is separated from semiconductor substrate 31 by a greater thickness of insulating layer 30. Gate 34, however, covers a portion of insulating layer 30 which has a narrow thickness.

For purposes of operative description of the embodiment illustrated by FIGS. 3 and 4, portion 37 of conductor plate 32 and insulating layer 30 are discussed as being transparent to electromagnetic radiation commensurate with the band gap energies of the semiconductor material in semiconductor substrate 31. It should be understood, however, with reference to this and other embodiments of our present invention that the other techniques mentioned hereinbefore may be utilized to provide for minority carriers which obviates the need for transparent conductor and insulating elements.

In operation, conductor plate 32 is biased by an appropriate emf source (not shown). A depletion region 38 forms beneath field plate portion 37 of conductor plate 32 due to the influence of the electric field. Because of the small area of extension 33 (and other overlap portions of conductor plate) and the greater thickness of the underlying insulating layer 30, the capacitance is small and the regions of semiconductor substrate lying beneath extension 33 are not significantly affected. In an initial measurement, current flowing from region 35 to region 36 through the field modified inversion region 39 may be measured by appropriate peripheral equipment (not shown) while the CIS capacitor is charged to the predetermined voltage. Unlike region 38 an equilibrium number of minority carriers is maintained in region 39 by the surface adjacent conductivity modified region 35, which is held at substantially the potential of substrate 31. Generated minority carriers are thus not stored in region 39.

Electromagnetic radiation of appropriate wavelengths incident upon semiconductor substrate 31 causes minority carriers to be generated as discussed hereinbefore. The minority carriers which are generated near or within the depletion region are swept to and stored at the surface of semiconductor substrate 31 beneath field plate portion 37 of conductor plate 32. The predetermined voltage is changed to a new value due to the presence of the generated minority carriers at the surface of the semiconductor substrate 31.

At a time subsequent to the initial charging of the CIS capacitor and storing of generated minority carriers, the current flowing between region 35 and region 36 is again measured. Because of the change of voltage and, therefore, electric field, the influence of the extension 33 on the inversion region 39 of semiconductor substrate 31 between source 35 and drain 36 causes a corresponding change in the current flowing therein. The current change is therefore a measure of the integrated electromagnetic flux incident upon semiconductor substrate 31 near depletion region 38 following the initial charging of the CIS capacitor.

FIG. 5 illustrates an integrated array of CIS devices arranged in an "XY pattern" on a substrate. The substrate supporting the devices may be of any suitable material consistent with the results desired to be obtained. Alternatively, the semiconductor material itself may be utilized as the substrate. In this latter feature the array comprises a semiconductor wafer upon which an insulating layer separates patterned conducting layers from the semiconductor material thereby establishing a plurality of capacitors. The array in either form is simply a plurality of rows and columns of a desired number. Thus, each CIS device may be identified by its occupancy position within a certain row and a certain column. For example, CIS device 50 having conductor plate 51 is in row $Xn$ and column $Ym$ and, therefore, is identified as capacitor $Xn$, $Ym$.

Each column has a set-reset line 52, an output line 53, and a column address line 54 "associated" with it. Each row is associated with a row address line 55. Thus, when CIS device 50 is being "addressed," the associated address row line 55 and column line 54 are both charged or "on."

There are two control portions, herein FET 56 and FET 57, associated with each capacitor. To charge the CIS device 50, it is necessary for CIS device 50 to be addressed and for the set-reset line 52 to be at the charging potential. The associated address lines 54, 55 act as gates to FET 56 which is connected via source 58 to the set-reset line 52 and via drain 59 and conductor plate extension 60 to conductor plate 51. Thus, FET 56 conducts only when address lines 54, 55 are both on. As is readily evident, the CIS device 50 may be discharged only under the identical circumstances.

It should be understood, however, that the concept of a multi-gate FET per se is not a part of this invention but is disclosed and claimed in Brown et al, application Ser. No. 679,957 filed Oct. 13, 1967 and now U.S. Pat. No. 3,566,518 and assigned to the present assignee.

When CIS device 50 is charged, a depletion region forms within semiconductor substrate 62 lying beneath the field plate portion 51' of conductor plate 51. As in the embodiment of FIGS. 3 and 4, field plate 51' shown by dotted lines overlies a narrow thickness region of insulating layer 61. Other portions of conductor plate 51 are deposited over regions of the insulating layer having a greater thickness thus restricting the depletion region to the portion of semiconductor substrate 62 lying beneath field plate 51 and a narrow thickness region of insulating layer 61.

When the semiconductor substrate in the proximity of field plate 51' is exposed to electromagnetic radiation of proper wavelengths, the minority carriers generated within the semiconductor by the incident radiation are swept to, and stored at, the surface of the semiconductor beneath field plate 51'. The presence of the minority carriers at the surface changes the voltage across the structure.

The electrical current readout of the stored information is accomplished through the use of conductor plate extension 60 and surface adjacent conductivity modified regions 63 and 64. FET 57 is connected to region 64 and to the associated output line 53 via drain contact 65. Region 63 is connected to the semiconductor substrate 62 via the contact 66. The associated column and row address lines 54, 55 again serve as gates and are accompanied by extension 60 of conductor plate 50 which serves in effect as a third gate. FET 57 therefore functions only when the associated address lines 54, 55 are on and extension 60 is charged. When CIS device 50 is allowed to discharge, the associated output line 53 conducts a current which is proportional to the discharge of the CIS device 50 and is therefore proportional to the change in the predetermined voltage.

Figure 6:
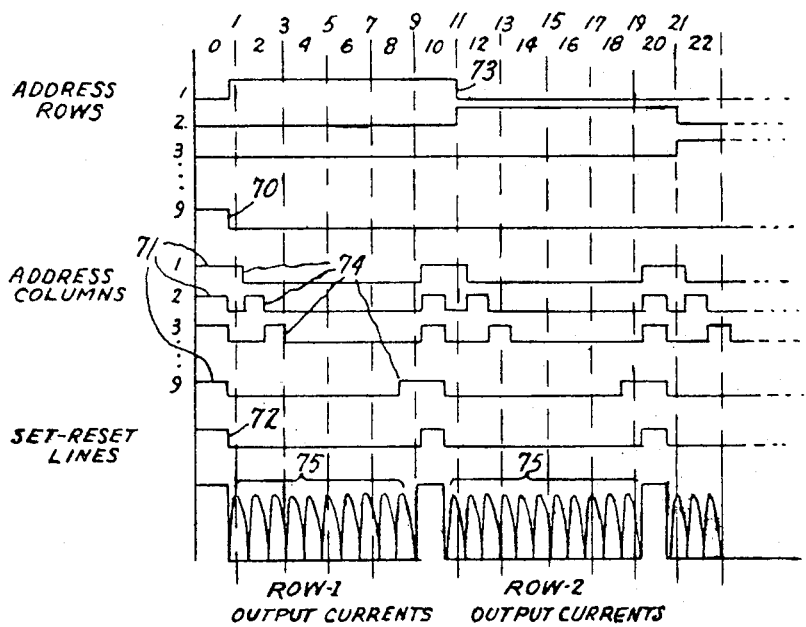
FIG. 6 illustrates a timing diagram showing an example operative sequence of the embodiment of FIG. 5.

The operation of the array is best explained by referring to the timing diagram of FIG. 6. For descriptive purposes, the timing diagram is illustrative of the sequential timing operation of a simple 9 × 9 array of capacitors, i.e., 9 rows and 9 columns. The numerals across the top represent timing intervals which may be of any desired interval magnitude. In an initial time-interval, the row 9 line is on as shown by curve 70. Curves 71 illustrate that all nine of the address column lines are on during the same time-interval and the set-reset lines are at the charging potential shown by curve 72. All the capacitors in row 9 are therefore charged because all are being simultaneously addressed. For the next nine time-intervals the row 1 line is on (see curve 73) and the column address lines are sequentially turned on as denoted by curves 74 and then off in numerical order. The column 1 address line remains on during the second time-interval. Because the set-reset lines are placed at ground potential during these time-intervals, the row 1 capacitors are sequentially discharged and simultaneously an output current is produced for each capacitor as illustrated by the skewed output current curves 75. The large output current shown during the charging intervals is produced because all gates of FET 57 and extension 60 are on during these intervals. As is evident, the timing constant of each capacitor is adjusted so that charging and discharging is accomplished over a portion of the address intervals. This may be conveniently done by geometric design of the field effect transistors.

At the end of nine time-intervals, all of the capacitors in row 1 are charged because the set-reset line is on, row 1 address line is on, and all column address lines are on. At the end of the charging time-interval, the row 2 capacitors are sequentially addressed and discharged. The sequence of addressing, discharging, and resetting continues until row 9 is addressed and discharged, completing a cycle. The array of capacitors thus functions to integrate, and store spacially, information contained in incident electromagnetic radiation for subsequent electric readout.

The semiconductor substrate 62 seen in FIG. 5 may be fabricated from any semiconductor material, silicon for example. A compact array of capacitors and associated circuitry may be fabricated by utilizing present silicon technology and self-registering technology such as that found in the aforementioned copending application Ser. No. 679,957 and the copending Application Ser. No. 675,228 of Brown et al., filed Oct. 13, 1967 and now U.S. Pat. No. 3,566,517 and assigned to the same assignee as the present invention. The compactness of the units allows the array to be utilized as an effective and highly sensitive image sensing and storing device. It is also apparent that the efficiency of an array may be raised or lowered by altering the ratio of the total capacitor area to array area. Thus, by increasing the ratio, the efficiency is increased due to the larger percentage of total radiation flux incident upon the array which is utilized by the capacitors. The quick rate of scan permitted by the solid state components compares favorably with existing scan rates used in commercial television systems.

Though the elements comprising the electrical readout portions of the array illustrated in FIG. 5 are discussed as being associated with a conductor insulator-semiconductor capacitors, it should be understood that the electrical readout may be employed in similar cooperative arrangement with other devices such as p-n junction diodes, and Schottky diodes, for example, utilized in the manner hereinbefore detailed to store information.

The desired operative time synchronization of an array like the one in FIG. 5 may be accomplished by exterior equipment (not shown) such as appropriate combinations of pulse counters with a high frequency pulse generator. The apparatus performing these exterior time sequence functions may be incorporated in peripheral regions of the array and are well known in the art.

FIG. 7 illustrates the structure of a CIS device 80 which may be utilized when capacitors with large surface area are employed and/or when it is desired more rapidly to charge and discharge the capacitor. In a simple capacitor design, for example, regions of a capacitor distant from a single contact utilized to charge the capacitor do not reach predetermined charging value at the same instant that regions adjacent the contact because of impedance effects. For large capacitors with a single contact, capacitive decoupling effects may be observed when charging and discharging.

To substantially prevent the occurrence of decoupling effects in an image storing array utilizing large CIS capacitors, we provide a conducting member with a plurality of spaced contacts made of a more highly conducting material, molybdenum for example, which makes electrical contact to the conductor along one surface thereto. Thus, in FIG. 7, the CIS device 80 comprises a semiconductor substrate 81, an insulating layer 82 on one surface of semiconductor substrate 81 and having a region of narrow thickness, and a plurality of spaced contacts 83 on the surface of the region of insulating layer 82 having the narrow thickness.

A capacitor field plate 84 is deposited on and between said spaced contacts and contacting the surface of insulator layer 82 therebetween. Contacts 83 are in mutual electrical contact with the charging voltage source (not shown). A protective layer 85 of insulating material may be deposited over said insulating layer 82 and field plate 84.

Depletion region 86, formed when the CIS device 80 is charged, is restricted substantially to the region of semiconductor substrate 81 directly beneath field plate 84, due to the increased thickness of insulating layer 82 surrounding the regions of narrow thickness.

In the embodiment illustrated by FIG. 7, different portions of field plate 84 experience charging substantially at the same instant of time, due to the plurality of contacts 83 and characteristic high conductivity thereof. Thus, the time needed to charge (and discharge) the CIS device 80 is less than it would be when a single contact is employed.

From the foregoing, it is apparent that we have described a novel method of receiving, storing and retrieving information which fulfills the objects as previously stated. Thus, the method is simple and effective in that a conductor-insulator-semiconductor is charged to a known value and minority carriers are controllably generated within the semiconductor material, thereby changing the voltage value. A measure of the change is in turn a measure of the number of minority carriers generated. By generating the carriers in proportional response to an information signal, the information is in effect stored in the CIS structure.

A simple yet efficient storage device is also described in detail. A CIS structure having a semiconductor with a restricted ability to generate minority carriers is utilized as a storage device. When exposed to electromagnetic radiation having energy as great as the semiconductor bandgap, minority carriers are generated within the semiconductor are driven to and stored at surface of the semiconductor beneath the conductor, and change a known voltage previously impressed upon the CIS structure. The change in voltage is a proportional measure of the amount of electromagnetic radiation flux incident upon the semiconductor since charging. Thus, the CIS structure acts as a flux integrator and storage device. By arranging a number of the integrating and storing devices in an array, a system is constructed which may be utilized as an image sensing and storing device which is capable of electrical readout without electron beam scanning.

While the invention has been disclosed with respect to certain embodiments, many modifications and variations will occur to those skilled in the art. For example, though the system described does not need electron beam scanning, one may be utilized when desired. The arrangement of the associated circuitry and design of the MOS-FET geometry may also be altered. Accordingly, by the appended claims, we intend to cover these and all such modifications and changes as fall within the true spirit and scope of the present invention.

What we claim as new and desire to secure by Letters Patent of the United States is:

1. Information storage and readout apparatus comprising
   a. a plurality of discrete semiconductor capacitive elements closely positioned in a matrix having a predetermined pattern, each capacitive element adapted to exist in a first voltage condition and in a second voltage condition;
   b. means for individually addressing each capacitive element; set-reset means associated with each of said capacitive elements for establishing said first voltage condition;
   c. output means associated with each of said semiconductor capacitive elements for conducting an output current substantially corresponding to a change of the initially predetermined voltage caused by the presence of minority carrier generated within said semiconductor capacitive element; and
   d. wherein said set-reset means and said output means are operative only when a selective capacitive element is being addressed.

2. The apparatus of claim 1 wherein each of said discrete capacitive elements is a p-n junction device.

3. Information storage and readout apparatus of claim 1 wherein the discrete capacitive elements each include:
   a. a semiconductor member;
   b. an insulator member on one major surface of said semiconductor member; and
   c. a conductor member on the surface of said semiconductor member for charging said capacitor to a predetermined voltage.

4. The apparatus of claim 3 including a substrate of semiconductor material wherein said semiconductor member of each capacitive element comprises a portion of said substrate of semiconductor material.

5. The apparatus of claim 4 wherein said substrate of semiconductor material is silicon.

6. The apparatus of claim 4 wherein said capacitive elements are arranged in an array of rows and columns and said set-reset means sequentially charges an entire row of said capacitive elements at substantially the same time when said entire row is being addressed by said addressing means and sequentially discharges each capacitor of a row of said capacitive elements as each capacitive element is being addressed by said addressing means.

7. The apparatus of claim 6 in which
   said addressing means comprises a set-reset control device for each capacitive element, an output control device associated with each capacitor, and an addressing line for each row and column;
   said set-reset means comprises a plurality of set-reset lines each associated with a column;
   said output means comprises a plurality of output lines each associated with a column;
   a. wherein said set-reset control device electrically connects the associated capacitive element to the associated set-reset line when the associated row and column addressing lines are simultaneously on; and b. wherein said output control device is electrically connected to an associated output line and produces the output current when said associated row and column addressing lines are simultaneously on and said associated set-reset line is discharging the associated capacitive element.

8. The apparatus of claim 7 wherein said set-reset control device is a multigate field effect transistor having the source connected to the associated set-reset line and drain to the associated capacitive element and wherein said gates are connected respectively to the associated address row line and associated address column line and a. wherein said output control means is a multigate field effect transistor in which the gates are respectively connected to the associated address row line and associated address column line, the drain is connected to the associated output line, and the source is connected to said substrate.

* * * * *